March 15, 1949.　　　W. R. DAVIES　　　2,464,438
CORN HUSKING MACHINE
Filed Dec. 26, 1944　　　3 Sheets-Sheet 1
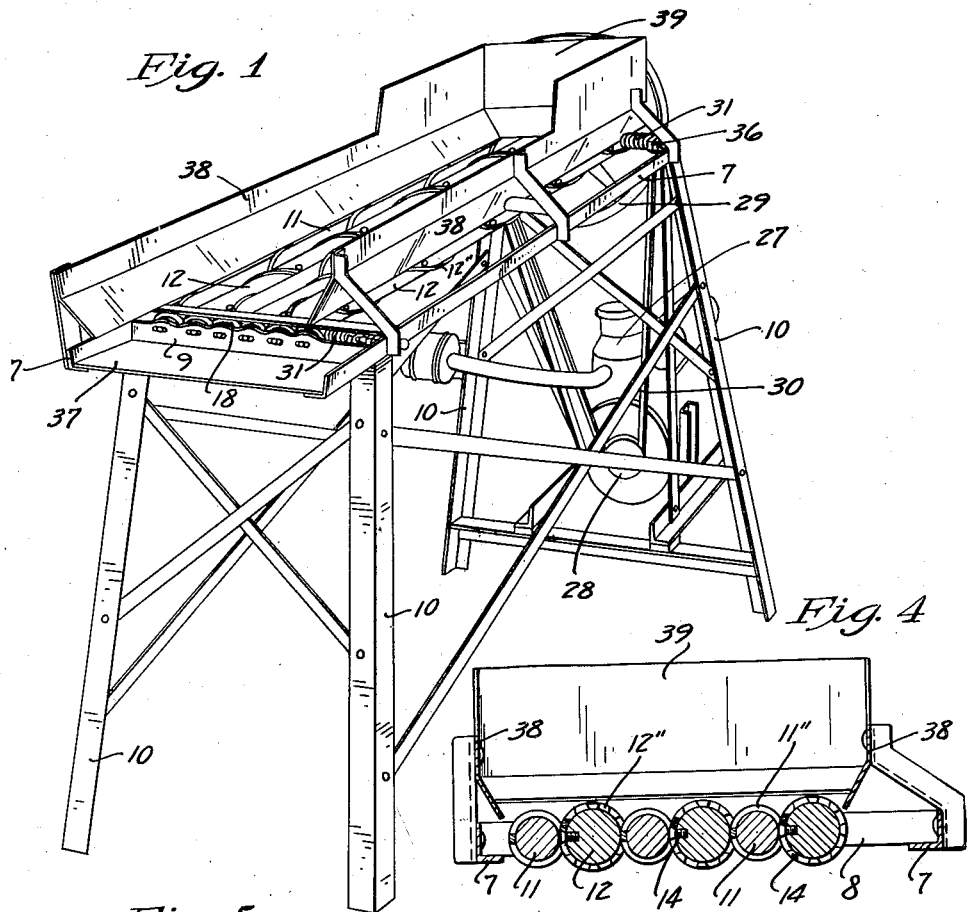
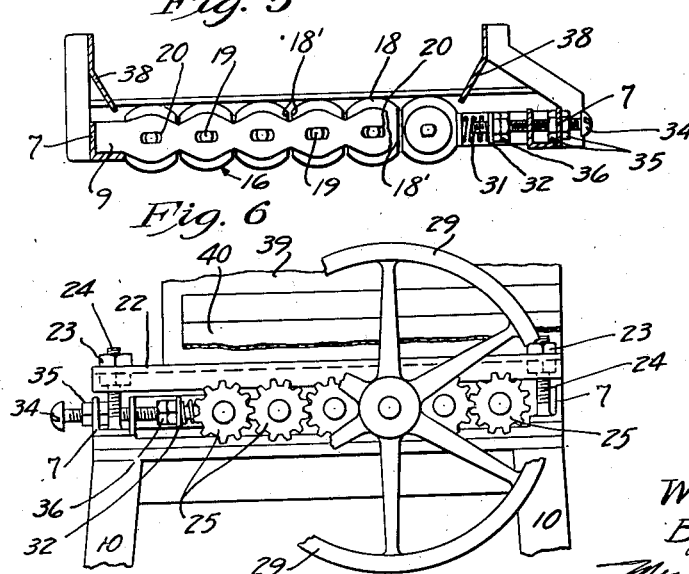
Inventor
Walter R. Davies
By his Attorneys
Merchant & Merchant

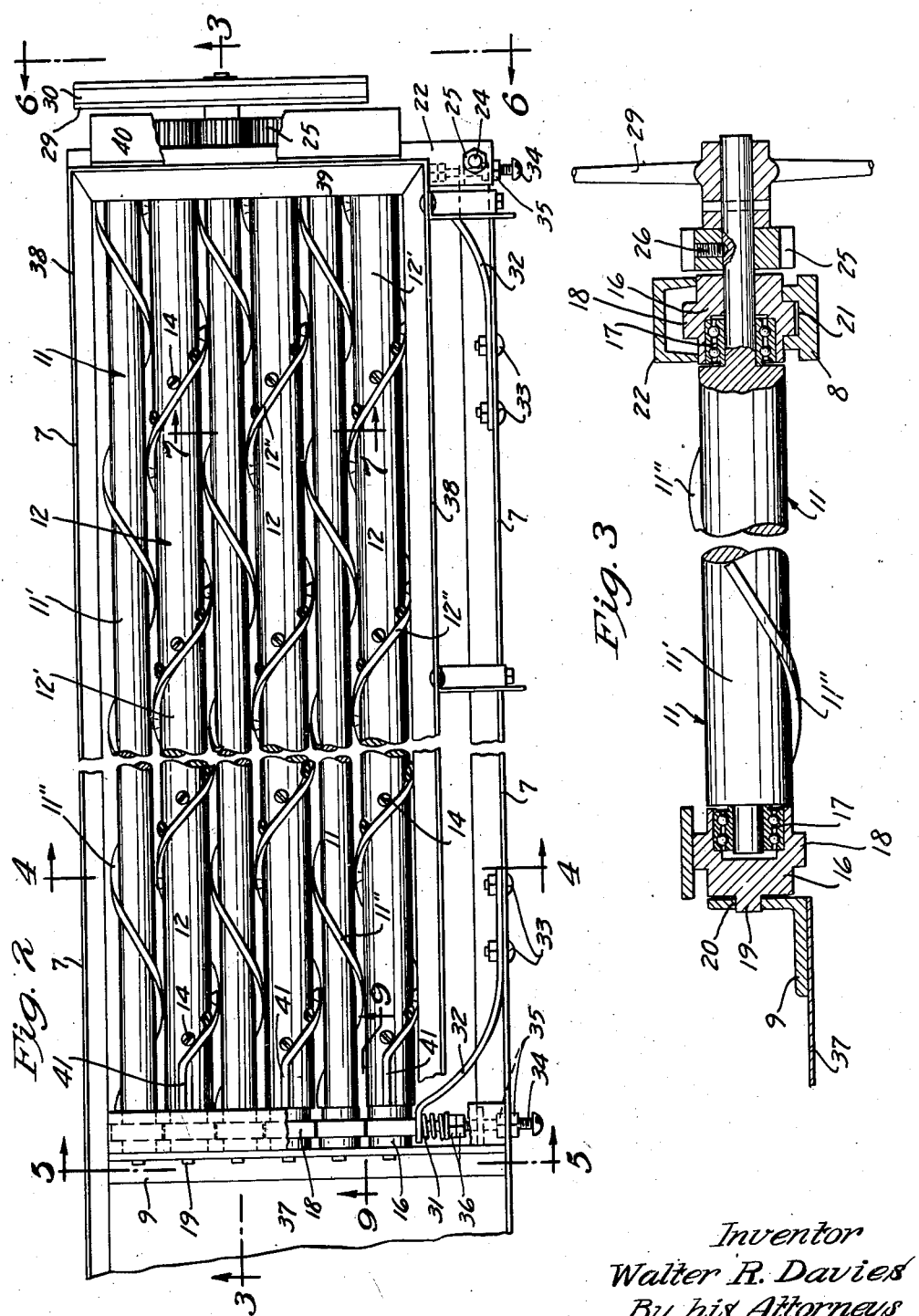

Inventor
Walter R. Davies
By his Attorneys
Merchant & Merchant

Patented Mar. 15, 1949

2,464,438

UNITED STATES PATENT OFFICE 2,464,438

CORN HUSKING MACHINE

Walter R. Davies, Shakopee, Minn., assignor to Northrup, King & Co., Minneapolis, Minn., a corporation of Minnesota Application December 26, 1944, Serial No. 569,876

6 Claims. (Cl. 130—5)

My present invention is in the nature of an improvement on the machine of my co-pending patent, Number 2,418,700, filed July 5, 1943, under title "Corn husking machine." The machine of the present invention, while primarily designed for the purpose of husking corn, has also been found highly efficient for other purposes; such, for example, as the thrashing of squash and pumpkins to remove the seeds therefrom for future planting.

The main objects and advantages of the present invention over the invention of my previously filed co-pending patent above identified may, for the most part, be briefly summed up as follows, to wit: more complete, cleaner, and faster removal of the husks from the ears with less damage to and a lower percentage of accidental removal of kernels from the corn ears; in other words, greater over-all efficiency of operation than was possible in the machines of the previous application, which latter, in itself, represented a great improvement over the art. In these respects, it may be said that the machines of my said co-pending application, while highly successful for the purposes intended, did, nevertheless, occasionally dig into and damage some of the kernels on a corn cob during the husk removing process, thereby causing the loss of the directly engaged kernel or kernels and the premature removal of other kernels. This feature of the machines of the previous application, while not serious enough to defeat the machines from a commercial point of view, nevertheless was objectionable particularly when the machines were used for husking of very expensive hybrid seed corn, and is a feature very largely overcome in the machine of the present invention.

The machine of the present invention, like those of my previous co-pending application, incorporates a plurality of elongated parallel roller elements that are power rotated, and which form a sort of grid over which corn cobs or relatively large pieces of squash, pumpkins, or the like are adapted to travel longitudinally and through which corn husks, loose kernels of corn, if any, and the seeds of squash, pumpkins, and the like are adapted to pass. These elongated roller elements are provided at their peripheries with means for gripping and tearing loose the husk and silk from cobs of corn and discharging the same downwardly between the roller elements, and for gripping and tearing loose from pieces of diced squash, pumpkins, or the like, the pithy or fibrous portions and seeds and discharging the same downwardly between the roller elements. In the preferred embodiment of the invention illustrated, feeding of material longitudinally of the roller elements is accomplished by tipping the roller elements longitudinally with respect to a horizontal plane and utilizing gravity as a motivating force, just as in the machines of my said previous application.

As in the case of the invention of my previous application above identified, the machine of the present invention also incorporates one or more pairs of roller elements of the type described. However, in accordance with the present invention all of the roller elements are provided at their peripheries with spiral vanes that run substantially in contact with the adjacent roller element or elements; whereas, in the machines of my previous application, only one of each pair of roller elements or every second roller element of the machines was provided with such a spiral vane. These spiral vanes of the present and previous machines serve, in conjunction with the adjacent roller elements and elements carried thereby to grip and downwardly feed corn husks or other fibrous portions and seeds of diced vegetables, such as squash and pumpkins through and between the roller elements. Adjacent roller elements of the present and previous applications are driven at like speed but in opposite directions producing downward feeding movements between the roller elements. In the machine of the present invention, as in the machines of the previous application, certain of the roller elements are provided with husking pegs or pins laid out in a spiral course. However, it should be noted that, whereas, in the previous machines the husking pegs or pins were applied only to a roller or rollers devoid of spiral vanes, the husking pegs or pins of the preferred embodiment of the present invention are applied to vane-equipped roller elements and are laid out in a spiral course parallel to and closely adjacent the spiral vane of the particular roller element or elements. These distinctions over the machines of my previous invention are highly important and are largely responsible for the improved results attributable to the present machine, and which were noted above.

The above and numerous other important objects, advantages, and features of the present invention will be made apparent from the following specification, claims, and appended drawings.

In the accompanying drawings, like characters indicate like parts throughout the several views.

Referring to the drawings:

Fig. 1 is a rear perspective view of a machine embodying the invention;

Fig. 2 is an enlarged plan view of the machine, with some parts broken away;

Fig. 3 is a still further enlarged detail view, with some parts broken away and some parts shown in full, taken on the section line 3—3 of Fig. 2;

Fig. 4 is a transverse sectional view taken on the line 4—4 of Fig. 2;

Fig. 5 is a transverse sectional view taken on the line 5—5 of Fig. 2;

Fig. 6 is a fragmentary front end view of the machine, with some parts broken away, and taken on the line 6—6 of Fig. 2;

Figure 7:
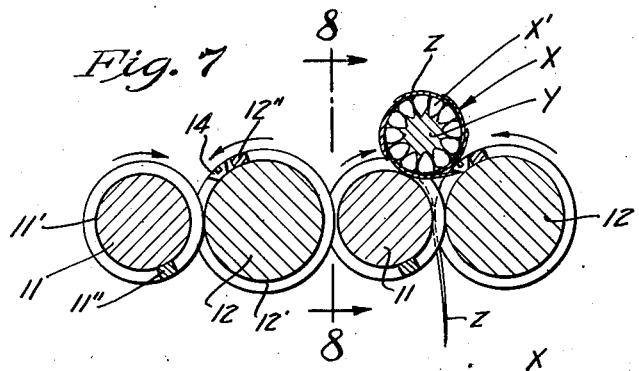
Fig. 7 is an enlarged transverse sectional view, with some parts on the section line omitted, taken on the line 7—7 of Fig. 2 and further illustrating, in cross section, an ear of corn during the husking operation.

The main frame of the machine illustrated is a rectangular affair composed of laterally spaced parallel angle iron side members 7, a front cross member 8, and a rear cross member 9. This rectangular frame structure is longitudinally inclined from front to rear and is supported by trussed legs 10. The roller elements of the invention are disposed within the rectangular frame and extend longitudinally of the laterally spaced frame side members 7.

In the preferred embodiment of the invention illustrated, there are provided a plurality of pairs of roller elements 11 and 12 respectively. Preferably and as illustrated, the roller elements 12 are of somewhat greater diameter than that of the roller elements 11, and the desirability of this feature will hereinafter be made clear. The cylindrical peripheral surfaces of the roller elements 11 and 12 are indicated by 11' and 12' respectively, while the spiral vanes of the roller elements 11 are indicated by 11" and the spiral vanes of the roller elements 12 are indicated by 12". The spiral vanes 11" and 12" are preferably, but not essentially, cross sectionally square and may be formed by winding cross sectionally square strips of steel or other metal spirally about the cylindrical bodies 11' and 12', and thereafter welding or brazing the same in place. The peripheries of the spiral vanes 11" and 12" preferably run in contact with the cylindrical peripheries of the adjacent roller elements.

The husking pegs or pins of the preferred embodiment of the invention herein illustrated are indicated by 14 and are applied to the roller elements 12 in a spiral course parallel to and immediately adjacent the spiral vanes 12" of said roller elements 12. These husking pegs or pins have outwardly flared heads with sharp edges, and are in the nature of screws having flared heads screwed directly into the roller elements 12 and having only their flared heads projecting beyond the cylindrical peripheries of the roller elements 12.

The roller elements 11 and 12 are reduced in diameter at their opposite ends and are journalled in lateral floating bearing elements 16 through the medium of ball-type anti-friction bearings 17. The several floating bearing elements 16 are provided with peripheral flanges 18 having diametrically opposed flat sides 18'. In the preferred structure illustrated, the flange-equipped bearing elements 16 are very slightly spaced when the spiral vanes 11" and 12" are in physical contact with their respective cooperating rollers. By reference particularly to Fig. 5, it will be seen that the flanges 18 of the bearing elements 16 of the rollers 11 and 12 have flat sides 18' that engage only to the extent of preventing rotation of the bearing elements, but which preferably do not prevent free engagement of the spiral vanes with the cylindrical peripheries of adjacent roller elements.

The bearing elements 16 at the rear ends of the rollers 11 and 12 are formed, in line with the axis of the rollers, with projecting studs 19 having diametrically opposed flat surfaces and which studs 19 work in slots 20 in the rear frame cross member 9. In this manner the rear bearing elements 16 are held firmly against vertical movement but are free for limited lateral movement one in respect to the other. The front bearing elements 16 all rest on the front frame cross member 8, which latter has a transverse upwardly opening channel 21 in which the bottoms of the peripheral flanges 18 of the front bearing elements are received. In the structure illustrated upward vertical movement of the front ends of the roller elements 11 and 12 is prevented by a transverse retaining bar 22 of channel shape cross section which overlies the front frame cross member 8 and engages the upper surfaces of the front bearing elements 16. This channel shaped retaining bar 22 is anchored between opposed nuts 23 on the upper ends of studs 24 that are rigidly anchored to and project upwardly from the frame side members 7. The frame cross member 8 and retaining bar 22 provide a guideway between them in which the front bearing elements 16 are free for lateral movements but are firmly held against vertical movements.

The reduced diameter shaft-forming front end portions of the roller elements 11 and 12 project forwardly through the front bearing elements 16 and are each equipped with a spur gear 25 held fast thereon by suitable set screws, or the like, 26. The several gears 25 intermesh to provide a gear train and this gear train is driven from a suitable source of power such as a conventional internal combustion engine 27, shown in Fig. 1, and which is suitably mounted at the front of the machine. The engine is equipped with a power driven pulley 28 and connection therebetween and the gear train described is provided by means of said pulley 28, a large speed reducing pulley 29 on the projected end of one of the reduced diameter shaft-forming portions of one of the spiral vane-equipped roller elements 11 and a belt 30 running over said pulleys 28 and 29.

The several roller elements 11 and 12 are all yieldingly pressed toward one another to the maximum extent permitted by engagement of their respective bearing elements 16 by coiled biasing springs 31 and cooperating leaf biasing springs 32. The leaf biasing springs 32 are anchored to one of the side frame elements 7 at 33 and have their free ends one in engagement with the peripheral flange of an outside front bearing element 16 and the other in engagement with the peripheral flange 18 of an outside rear bearing element 16. The coiled compression type biasing springs 31 are mounted on stop bolts 34 that project through one of the frame side members 7 and are locked in place thereon by opposed lock nuts 35. The free ends of the stop bolts 34 are adjusted to be spaced from the free ends of the leaf springs 32 just sufficiently to limit spacing between any cooperating pair of roller elements 11 and 12 to slightly less than what is required to bring the cooperating gears 25 of said rollers out of mesh. In other words, these stops will prevent accidental unmeshing of any cooperating pair of gears 25 which is a necessary precaution in order to maintain a definite timed relation between the rollers 11 and 12.

Tension of the compression springs 31 is determined by nuts 36 on the stop bolts 34 and against which the outer ends of the springs 31 react. It will be noted particularly by reference to Figs. 5 and 6 that the bearing elements 16 at the extreme side of the machine opposite the biasing springs 31 and 32 have their peripheral flanges 18 in engagement with a frame side member 7 and are thereby limited against lateral movement in that direction under the action of the biasing springs 31 and 32.

Preferably the rear ends of the laterally spaced frame members 7 are projected rearwardly beyond the cross member 9 and support an apron-forming plate 37. Preferably also the sides and front of the machine are built up by side baffle plates 38 and a front end baffle plate 39 to provide a sort of hopper for maintaining material within the space above the several roller elements 11 and 12, these baffle plates 38 and 39 being supported mainly from the laterally spaced frame side member 7. The rear baffle plate 39, it will be noted particularly by reference to Fig. 2, is provided with a forwardly projecting guard plate 40 overlying the train of gears 25.

In the preferred embodiment of the invention illustrated all of the spiral vane-equipped roller elements 11 are driven in a clockwise direction with respect to Figs. 1, 2, 4 and 5 and all of the peg-equipped roller elements 12 are driven in a counter-clockwise direction in respect to said figures, so that downward feeding action is produced between each spiral vane-equipped roller 11 and an adjacent peg-equipped roller element 12.

While I do not wish to limit myself to any specific dimensions or measurements, I believe it would expedite the efforts of anyone attempting to reproduce the machine from the present disclosure to be apprised of certain specifications which have been proven successful in commercial devices and, therefore, offer the following specifications representative of those most successfully used to this date.

In the commercial machine from which these drawings were made, the roller elements 11 and 12 are 5 feet in length. The cylindrical bodies 11' of the roller elements 11 are 2 inches in diameter and the spiral vanes 11'' of said roller elements 11 are formed of stock ¼'' by ¼'' square, thereby bringing the over-all diameter of the roller elements 11 up to 2½ inches. The cylindrical bodies 12' of the roller elements 12 are 2½ inches in diameter, or in other words, of a diameter equal to the over-all diameter of the spiral vane-equipped roller elements 11. The spiral vanes 12'' are of the same cross sectional dimensions as are the spiral vanes 11'', and, therefore, contact the cylindrical peripheries 11' of the roller elements 11. The spiral vanes 11'' and 12'' are preferably continuous and unbroken from one end to the other end of their respective roller elements and have a pitch of one full convolution to the linear foot measured axially of their respective roller elements. These spiral vanes 11'' and 12'' are wound about their respective roller elements 11 and 12 in opposite directions; the spiral vanes 11'' preferably coiled about the roller elements 11 in the direction of rotation of the roller elements 11 from the input end of the machine toward the output end of the machine, and the spiral vanes 12'' being wound spirally about the roller elements 12 in the direction of rotation of said roller elements 12 from the input toward the output end of the machine. The husking pegs or pins 14 of the roller elements 12 are, as previously indicated, laid out in spiral courses parallel to and having the same pitch as the spiral vanes 12'', and preferably the upper ends of these husking pegs or pins are substantially in contact with and terminate even with the top of said adjacent spiral vanes. Also important to note is that the husking pegs or pins of the roller elements 12 are applied adjacent the leading edges of the spiral vanes 12'', so that each husking peg or pin will come into engagement with the corn husk or other material being operated on before an immediately adjacent portion of a cooperating spiral vane.

For the purpose of positively shearing off any portion of the husk that remains on a corn ear and tends to prevent final discharge thereof from the discharge end of the machine, each of the spiral vanes 11'' and 12'' is provided immediately adjacent the discharge end of the machine with an axially or longitudinally projecting portion 41 that is preferably two to three inches in length and will serve as a shearing blade accomplishing the identical purpose assigned to the shearing blades 41 of my above identified co-pending application.

It should be definitely understood that the detailed specifications and measurements given above are given for the convenience of anyone attempting to utilize the invention and not for the purpose of in any way limiting the claims in this application.

*Operation*

In the husking of corn, the ears of corn, complete with their husks, are dumped on to the front end portions of the roller elements 11 and 12 while the same are revolving in the manner described. Due to the forward inclination of the rollers, the ears will tend to gravitate from front to rear of the machine, but in the course of their movement, the husks thereof will be gripped by the revolving husking pins 14 and will be pulled downwardly thereby between a cooperating pair of roller elements 11 and 12 where they will be caught between revolving vanes 11'' or 12'' and the periphery of cooperating rollers 11 and 12 and be pulled loose from the cob and dropped to the ground or receptacle beneath the rollers.

Of course, the whole husk will not be removed at one time but rather will be removed in fragments or sections. The ears of corn will tend to become disposed longitudinally of the rollers and will be continuously revolved on their own axes so that all portions of the husk will be drawn between adjacent rollers at some time during the course of travel of the ear from front to rear of the machine under the action of gravity. Of course, when portions of the husk get between the periphery of a spiral vane 11'' or 12'' and the periphery of an adjacent roller, the roller elements 11 and 12 will be forced to part against the action of the biasing springs to permit the downward passage of the husk.

Finally the husked ears of corn are discharged over the rear ends of the rollers 11 and 12 by gravity on to the apron 37 from which they will be discharged into a suitable receptacle, conveyor, or the like.

In practice it has been found that short, stubby ends of the husk remaining on one end of the ear of corn are apt to prevent free discharge of the husked ears off of the rear ends of the roller elements, and it is for this purpose that I preferably provided the integral shearing blade-forming portions 41 of the vanes 11" and 12". These shearing blade-forming portions 41 cooperate with the adjacent roller elements 12 to shear off such remaining stub portions of the husk as may tend to retard feeding action of the ear.

The machine described has been tried and found highly efficient for use in husking all varieties of corn including fancy seed corn, field corn and popcorn, and with substantially no damage to the kernels of corn on the cobs, and in this respect the present machine represents a considerable improvement of the machine of my said co-pending application. However, should a kernel of corn be displaced from the cob during the husking process, such kernel will usually pass freely between the rollers without damage and may be collected for seed or feed purposes.

In the thrashing of squash or pumpkin the mealy bodies thereof are diced and placed upon the rollers, just as in the case of ears of corn, complete with their attached pithy or fibrous interior substance and seeds. During the course of travel of these diced pieces of squash or pumpkin over the roller elements 11 and 12, the fibrous or pithy substance and seeds will be pulled loose from the mealy bodies and discharged downwardly between the rollers, whereas the mealy bodies will be discharged just as husked ears of corn. To obtain the seed all that is necessary now is to separate the same from the pithy or fibrous substance and, of course, the diced mealy portions of the pumpkin or squash may be saved for food purposes.

Figure 8:
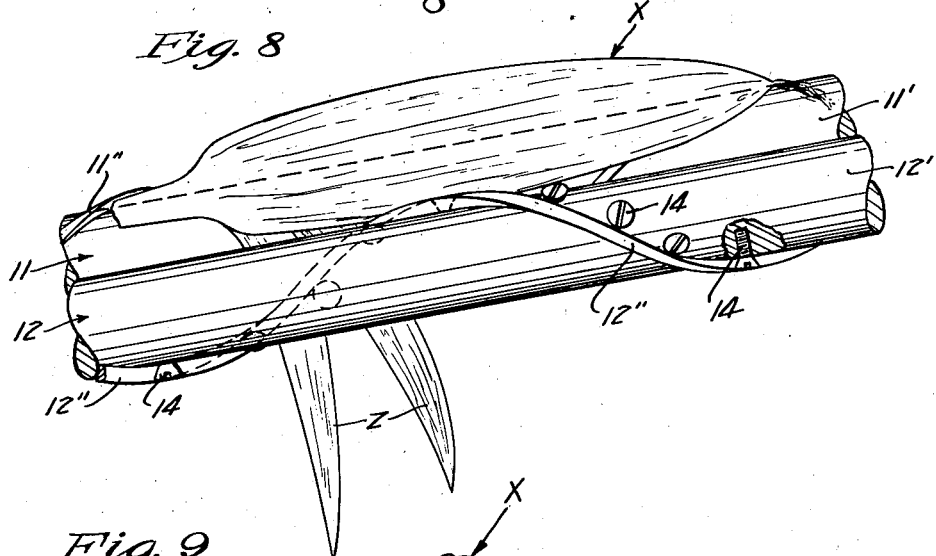
Fig. 8 is a sectional view taken on the line 8—8 of Fig. 7.
Figure 9:
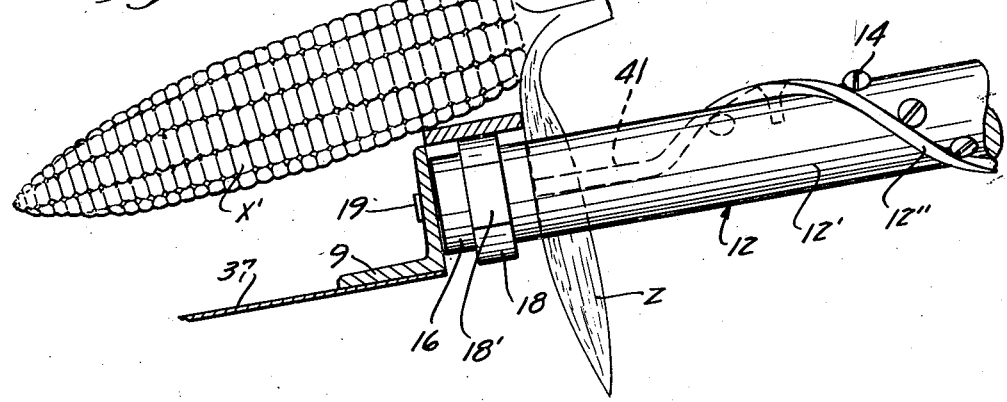
Fig. 9 is an enlarged detail sectional view taken on the line 9—9 of Fig. 2 and showing a husked ear of corn leaving the discharge end of the machine.

The spiral vanes 12" function much as do the spiral vanes 11", and in and of themselves materially increase the efficiency of the machine insofar as clean and rapid husking of the corn cobs are concerned. Their particular cooperative relationship with the husking pegs or pins 14 is a feature of particular importance and one which is largely responsible for greatly reducing the percentage of kernels that are removed from the cob or damaged during the husking operation. In this respect, attention is called to the fact that the spiral vanes 12" function as depth gauges to definitely limit the depth of the bite of each of the pins 14 and automatically prevent the pins from directly engaging the corn kernels. While this action is both difficult to illustrate and describe, an attempt at this has been made particularly in Figs. 7 and 8, by reference to which the following action will be noted. An ear of corn in these figures and in Fig. 9 is indicated as an entirety by X, the cob portion thereof by Y, and the husk by Z. As previously indicated, the ears of corn X tend to progress longitudinally down the channels formed between adjacent roller elements 11 and 12 and tend to be rotated or oscillated on their own axes during their course of travel from the input end toward the output end of the machine. In fact, when both rollers of each pair are equipped with spiral vanes as in the present instance, the rotation of the ears will tend to be in one direction when the major engagement thereof is by a spiral vane 11" and will tend to be in the opposite direction when the major engagement is by the spiral vane 12", although the over-all direction of rotation will be by the roller elements 12 due largely to the action of the husking pins. Now, by particular reference to Fig. 8, it may be seen that the ears of corn X, before being engaged by any particular husking pin or peg 14, will first project over and be engaged by an adjacent but leading portion of a cooperating spiral vane 12", which latter will tend to definitely limit the depth of the bite by that particular pin or peg 14 and will definitely tend to retract the pin away from the ear following initial engagement of the pin with the husk. In this connection, the husking pins or pegs are permitted to engage the husk to a sufficient depth to firmly grip the same, but are prevented from digging into the corn kernels indicated by X'. While it is difficult to fully convey the cooperating action between the vanes 12" and their cooperating husking pegs or pins 14, the improvement afforded by the particular arrangement described is very notable in operation and has proven to be of great commercial importance.

A further contributing factor to the improved results obtained by the machine described is the fact that there is a slightly greater peripheral speed between the outer surfaces of the spiral vanes 12" and the engaged cylindrical surfaces of the rollers 11 resulting from the considerably greater over-all diameter of the vane-equipped roller elements 12" as compared to the engaged cylindrical surfaces of the roller elements 11. In practice, it has been found that the above noted peripheral speed difference tends to further increase the husk removing efficiency of the machine without producing any adverse effects.

What I claim is:

1. In a corn husking machine, a frame, a cooperating pair of roller elements journalled to the frame is parallel relation, each roller element comprising a cylindrical main body and a substantially continuous peripheral spiral vane projecting therefrom and extending substantially from end to end of the cylindrical main body, the convolutions of the peripheral spiral vane of each element running between the convolutions of the other roller element and substantially in contact with the cylindrical main body of the other roller element, the axial distance between adjacent convolutions of the spiral vanes being such that an ear of corn will engage the cylindrical surface of the main body of one roller element while being engaged by the spiral vane of another roller element, mechanism driving the roller elements in directions to produce downward feeding movement therebetween, and a series of spaced husking projections on the main body of one of the roller elements laid out in a spiral course parallel to and closely adjacent the leading side of the spiral vane of that roller element.

2. The structure defined in claim 1 in which the ends of the husking projections run substantially in contact with the cylindrical surface of the main body of the other roller element.

3. The structure defined in claim 1 in which the ends of the husking projections run substantially in contact with the cylindrical surface of the main body of the other roller element and in which the leading sides of the husking projections flare toward their outer ends.

4. The structure defined in claim 1 in which only one of said roller elements is equipped with said husking projections.

5. The structure defined in claim 1 in which only one of said roller elements is equipped with said husking projections, and in which said mechanism drives the husking projection-equipped roller element at a greater peripheral speed than the other of said roller element.

6. The structure defined in claim 1 in which only one of said roller elements is equipped with said husking projections, and in which said mechanism drives the husking projection-equipped roller element at a greater peripheral speed than the other of said roller element, said husking projections having outwardly flaring heads that run substantially in contact with the cylindrical surface of the other roller element.

WALTER R. DAVIES.

REFERENCES CITED

The following references are of record in the file of this patent:

UNITED STATES PATENTS

| Number | Name | Date |
| --- | --- | --- |
| 196,400 | Terman | Oct. 23, 1877 |
| 723,944 | Tice | Mar. 31, 1903 |
| 1,002,530 | Legg | Sept. 5, 1911 |
| 1,077,313 | Steichen | Nov. 4, 1913 |
| 1,077,963 | Baird | Nov. 4, 1913 |
| 1,314,353 | Morral | Aug. 26, 1919 |
| 1,682,142 | Paradise et al. | Aug. 28, 1928 |
| 1,830,772 | Stadtherr | Nov. 10, 1931 |
| 2,315,950 | Fitzloff | Apr. 6, 1943 |
| 2,329,768 | Kerr | Sept. 21, 1943 |
| 2,418,700 | Davies | Apr. 8, 1947 |